Figure 1A:
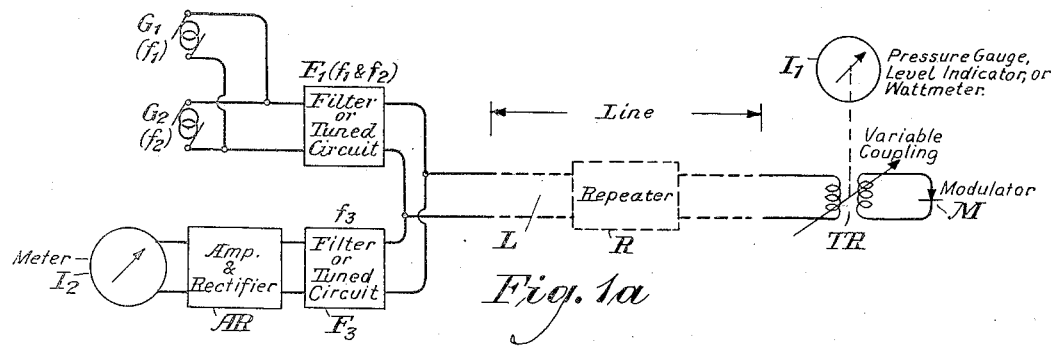

May 5, 1936.   E. I. GREEN ET AL   2,039,405

REMOTE METERING SYSTEM

Filed March 21, 1933   3 Sheets-Sheet 1

INVENTORS
E. I. Green and W. H. Tidd
BY
ATTORNEY

May 5, 1936.  E. I. GREEN ET AL  2,039,405
REMOTE METERING SYSTEM
Filed March 21, 1933   3 Sheets-Sheet 2

INVENTORS
E. I. Green and W. H. Tidd
BY
ATTORNEY

May 5, 1936.  E. I. GREEN ET AL  2,039,405
REMOTE METERING SYSTEM
Filed March 21, 1933  3 Sheets-Sheet 3
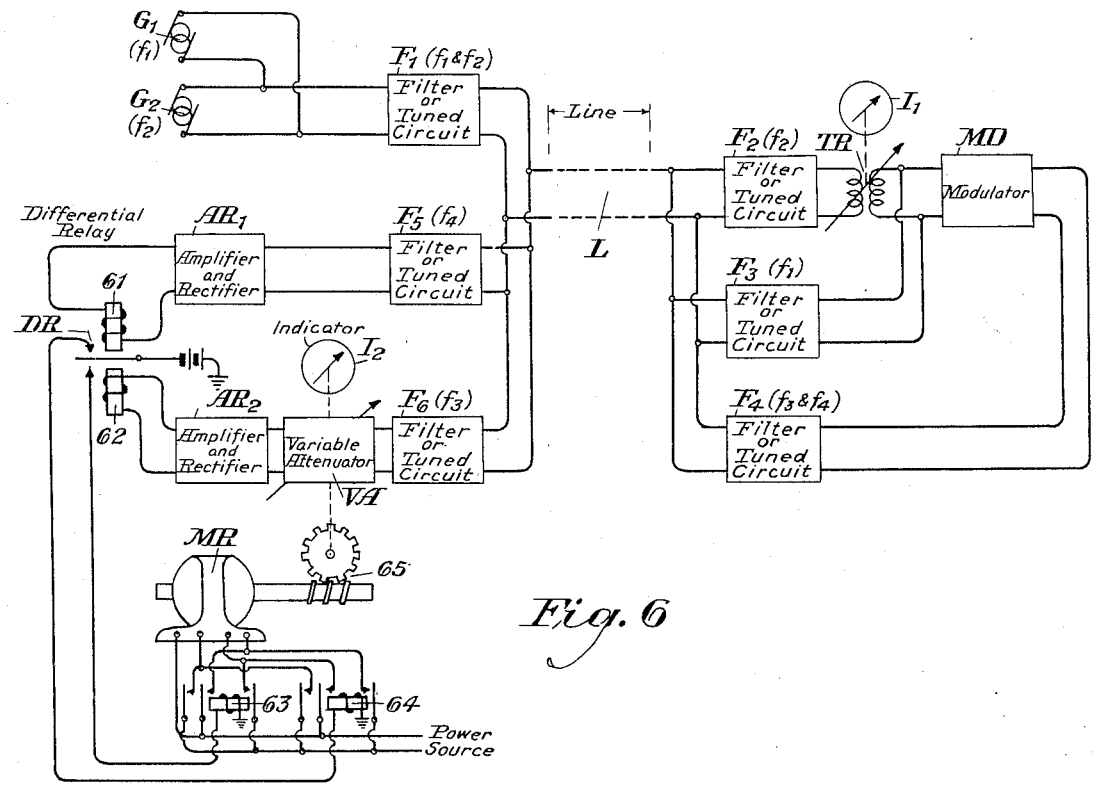
Fig. 6
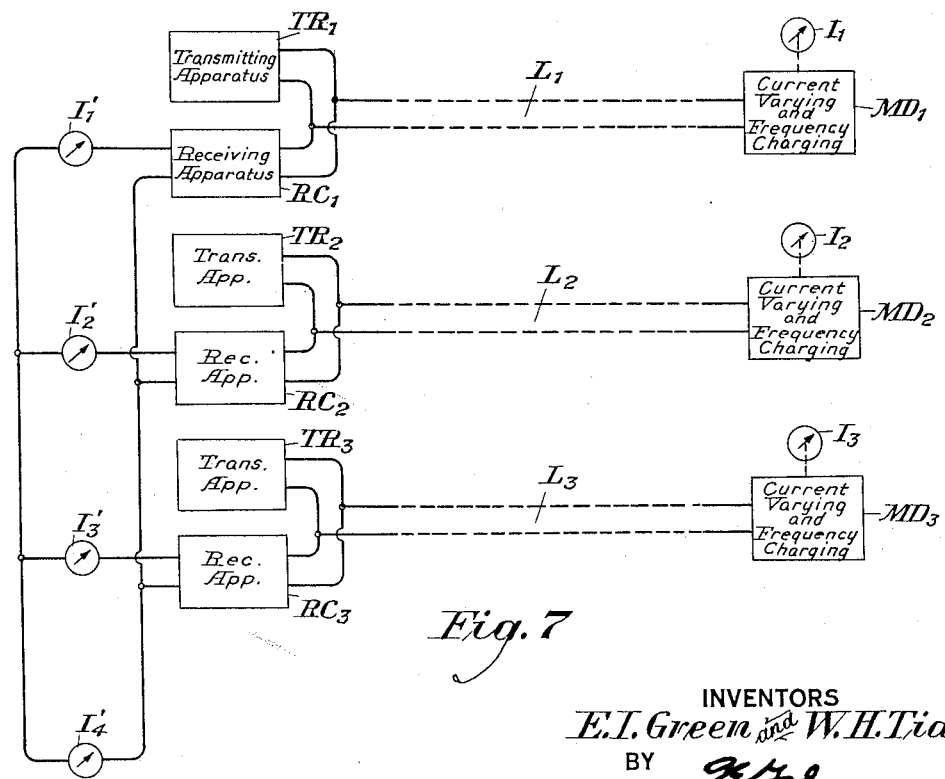
Fig. 7
INVENTORS
E. I. Green and W. H. Tidd
BY
ATTORNEY Patented May 5, 1936

2,039,405

UNITED STATES PATENT OFFICE 2,039,405

REMOTE METERING SYSTEM

Estill I. Green, East Orange, N. J., and Warren H. Tidd, White Plains, N. Y., assignors to American Telephone and Telegraph Company, a corporation of New York Application March 21, 1933, Serial No. 662,003

22 Claims. (Cl. 177—351)

This invention relates to arrangements for indicating at some point, by electrical translating means, the position of one or more movable elements or the magnitude of one or more quantities located at a remote point.

It is the object of the invention to provide a system adapted to the remote metering of such quantities as pressures, levels, positions, flows, voltages, currents, watts, etc.

More particularly, it is an object of this invention to provide a remote metering system in which no source of power or moving electrical contact is necessary at the remote point where the quantity to be measured exists.

In certain applications of remote metering systems, such as in connection with gas distribution systems, oil pipe lines and certain similar cases, a source of power or a moving electrical contact at the point where the quantity to be measured originates might be hazardous due to the possibility of sparking. It might also in certain cases be uneconomical to furnish a source of power at the remote point due to the nature of the location. It is with these conditions in mind that the systems about to be described have been designed.

In accordance with one embodiment of the invention, two frequencies are transmitted from the point where the indication is to be utilized to the remote point where the quantity to be indicated exists. At this remote point, these two frequencies are intermodulated to produce a third frequency which is returned to the transmitting end. The system is so designed that the magnitude of the third frequency resulting from the modulation process is proportional to the magnitude of the quantity to be indicated. At the transmitting end, the returned frequency is selected and used to actuate a suitable indicating device. In another form of the invention, it is proposed to transmit only a single frequency, generate one of its harmonics at the remote location, control the amplitude of this harmonic in accordance with the quantity to be indicated and return this harmonic frequency to the transmitting location to produce an indication of the magnitude of the distant quantity.

It is a further object of the invention to provide a remote metering system in which no moving electrical contact or source of power is necessary at the remote point and in which the amplitude relation between currents of several frequencies is used to produce an indication of the quantity, the frequency being so chosen and utilized that the indication is substantially independent of variations in the transmission characteristics of the channel.

Figure 1B:
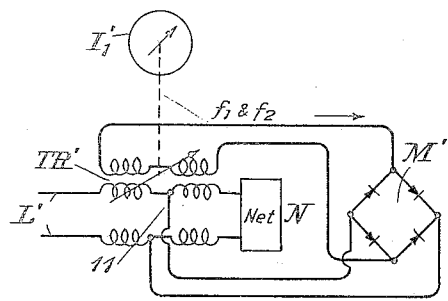
Figure 1C:
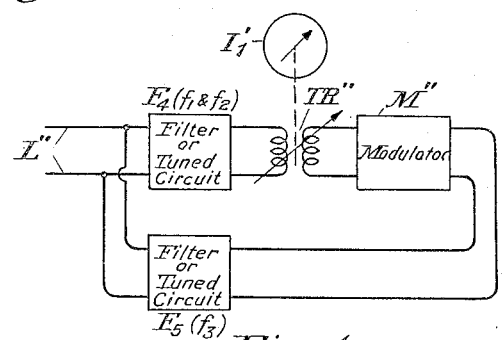
Figure 2A:
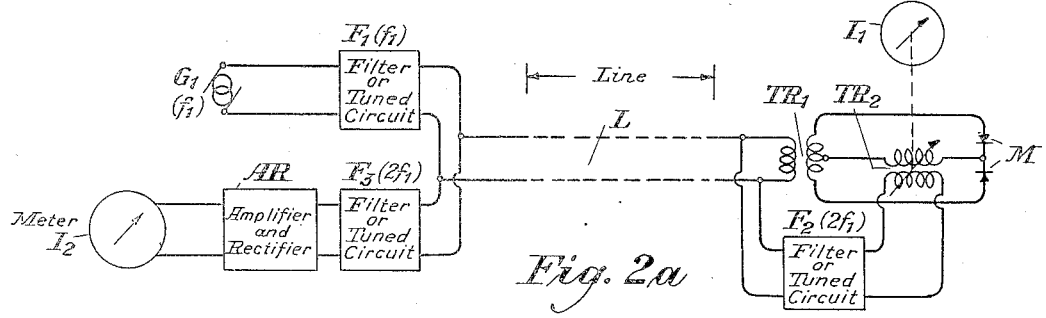
Figure 2B:
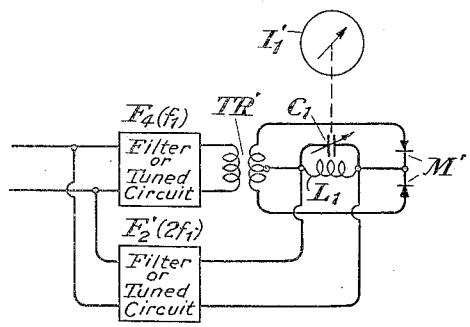
Figure 3:
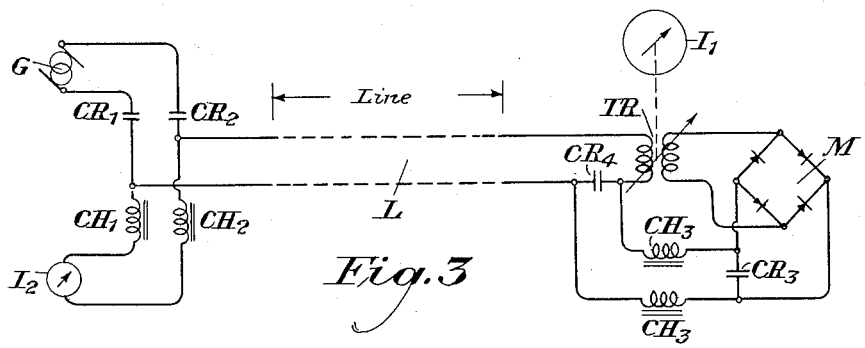
Figure 4:
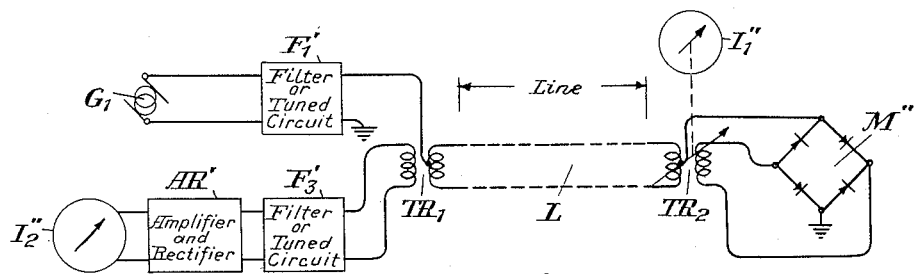
Figure 5A:
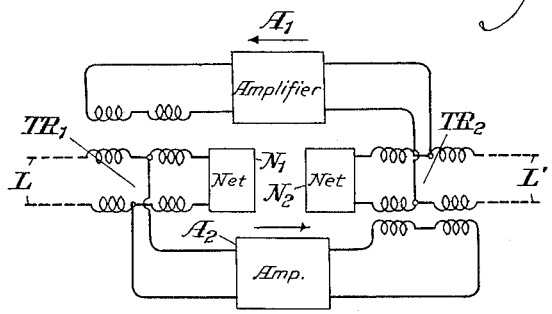
Figure 5B:
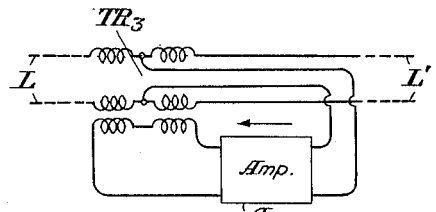
Figure 5C:
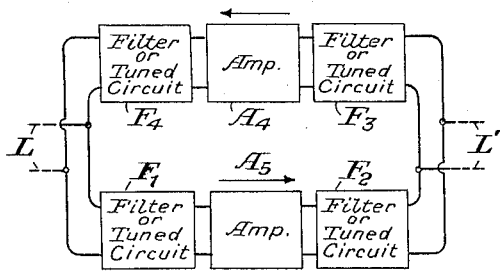
Figure 5D:
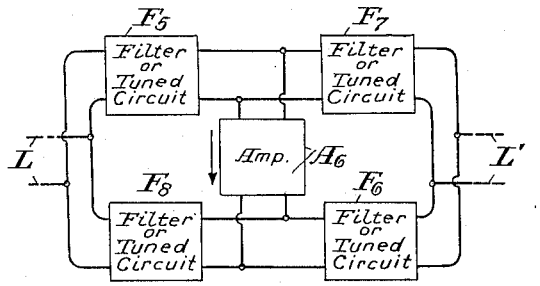

While the invention will be defined in the appended claims, the features of the invention will be more fully understood from the detailed exposition which follows, read in connection with the accompanying diagrams, Figures 1 to 7. Fig. 1—$a$ is a diagram showing one embodiment of a remote metering system in which two frequencies are transmitted and one frequency returned. Figs. 1—$b$ and 1—$c$ show other arrangements at the remote point where the quantity to be indicated is located. Fig. 2—$a$ shows a possible embodiment of a system in which a single frequency is transmitted and one of its harmonics is returned. Fig. 2—$b$ shows an alternative arrangement for the distant end. Fig. 3 represents a system in which current of one frequency is transmitted and direct current returned. Fig. 4 shows a method of applying the frequencies to the line in such manner that transmissions in opposite directions will cause no mutual interference. Figs. 5—$a$, 5—$b$, 5—$c$ and 5—$d$ illustrate several methods of inserting amplifiers or repeaters in a wire line which would be suitable for use with remote metering systems similar to those described herein. Fig. 6 shows an arrangement in which four frequencies are so chosen and used that the indication is substantially independent of variations in the transmission equivalent of the line. Fig. 7 shows a possible way of indicating the total of several quantities existing at remote points.

Referring to Fig. 1—$a$, two generators $G_1$ and $G_2$ are shown which generate the frequencies $f_1$ and $f_2$. A combination of filters or tuned circuits $F_1$ transmits currents of these frequencies to the transmission line L. This may be any suitable transmission channel such as a pair of wires, a coaxial conductor circuit or a radio channel. The transmission line may include intermediate amplifiers or repeaters as indicated at R in Fig. 1—$a$.

At the distant location currents of frequency $f_1$ and $f_2$ are transmitted by the transformer TR to the modulator M. This modulator M may be any passive modulator such as a device using copper-oxide, thyrite, or a magnetic modulator. This modulator M combines frequencies $f_1$ and $f_2$ to produce several new frequencies. These are again transmitted through the transformer TR and sent back over the transmission channel L. The magnetic coupling between the two windings of transformer TR is variable, and the amount of this coupling is controlled directly or indirectly by the gauge or meter $I_1$. The transmission efficiency of the device, therefore, varies correspondingly. The meter $I_1$ may be a pressure gauge, lever indicator, flow meter, voltmeter, ammeter, wattmeter, or any suitable indicator. Due to this variation in the transmission efficiency of the transformer TR, the amount of the modulation products from the modulator M which is retransmitted is varied in accordance with the magnitude of the quantity measured by $I_1$.

At the transmitting end, a filter or tuned circuit $F_3$ selects one of the new frequencies $f_3$ which was produced by the modulator M at the remote location. Current of this frequency $f_3$ is amplified and rectified in the amplifier-rectifier AR, the output of which is indicated by the meter $I_2$. Due to the action of the variable magnetic coupling of the transformer TR controlled by the gauge or meter $I_1$, variations in the magnitude of the quantity being measured are transmitted as amplitude variations of the frequency $f_3$ and these variations are indicated by the meter $I_2$. Therefore, the reading of the meter $I_2$ is proportional to the magnitude of the quantity being measured. The meter may be so calibrated that the magnitude may be indicated directly in appropriate units. The output of the amplifier-rectifier AR may be used to actuate a recording device or an integrating mechanism if these features are desired in addition to the visual indication.

Fig. 1—b shows another arrangement for the remote location. A three-winding transformer or hybrid coil TR' is used in this case. Frequencies $f_1$ and $f_2$ are transmitted from the line L' to the modulator by means of windings 11 of transformer TR'. The magnetic coupling between these windings and the line circuit is varied in accordance with the magnitude of the quantity measured by gauge or meter $I_1'$. The modulator M' in this case is shown as a bridge arrangement using four passive non-linear elements which may be of any suitable type. A frequency $f_3$ which is some modulation product of frequencies $f_1$ and $f_2$ is applied to the line in a manner conjugate to that in which frequencies $f_1$ and $f_2$ were taken from the line. A balancing network N is shown which balances the effect of the line in such a way that substantially no current of frequency $f_3$ is transmitted to the input of the modulator.

Fig. 1—c shows still another possible arrangement of the apparatus at the remote location. In this case frequencies $f_1$ and $f_2$ are selected by a combination of filters or tuned circuits $F_4$ and introduced to the modulator M'' through the windings of the transformer TR''. The coupling between the windings of this transformer is varied in accordance with the magnitude measured by $I_1''$. The modulator may be of any suitable type. A filter or tuned circuit $F_5$ selects frequency $f_3$, which is a result of the modulation of frequencies $f_1$ and $f_2$, and retransmits current of this frequency to the line. In this way interference between the input and output of the modulator M'' is obviated.

It is possible to select for the returned frequency $f_3$ one of several frequencies depending upon the modulation process used. If the modulator is a second order device, the frequency $f_3$ may be either the sum or difference of the two impressed frequencies, that is $f_3 = f_1 \pm f_2$. Or in case third order modulation products are predominant, a frequency $f_3$ might be selected which is equal to one of the frequencies added or subtracted from twice the other, that is, $f_3 = 2f_1 \pm f_2$, or $f_3 = 2f_2 \pm f_1$.

A possible modification of the above system is shown in Fig. 2—a. In this embodiment of the invention only one frequency $f_1$ is generated by the oscillator $G_1$. The filter $F_1$ passes current of this frequency to the line L over which it is transmitted to the distant point where the quantity to be indicated exists. A transformer $TR_1$ transmits current of frequency $f_1$ to the modulator M which in this diagram is shown as a balanced modulator employing two passive non-linear elements. In this case, the second harmonic of frequency $f_1$ is predominant and this frequency $2f_1$ is transmitted through the transformer $TR_2$, to the filter or tuned circuit $F_2$, and thence applied to the transmission channel L. The coupling of transformer $TR_2$ is varied in accordance with the meter $I_1$ thus modulating current of frequency $2f_1$. At the transmitting end of the line a filter or tuned circuit $F_3$ selects this current and passes it to the amplifier-rectifier AR. The output from the amplifier-rectifier is indicated on the meter $I_2$. The indication of meter $I_2$ varies with the amplitude of the returned frequency $2f_1$ and thus is an indication of the magnitude of the quantity measured by the meter $I_1$.

An alternative arrangement of the apparatus at the distant end is shown in Fig. 2—b. A filter or tuned circuit $F_4$ and transformer TR' transmit current of frequency $f_1$ to the modulator circuit. The output of modulator M' in this case is impressed across the parallel combination of capacity $C_1$ and inductance $L_1$. The capacitance of the condenser $C_1$ in this circuit is varied directly or indirectly in accordance with the magnitude of the quantity measured by $I_1'$. The variation thus produced in the impedance of combination $C_1$ and $L_1$ impresses a voltage on the line circuit through the filter or tuned circuit $F_2'$, which depends on the magnitude of said quantity. This is retransmitted and indicated at the transmitting end as in Fig. 2—a.

It is, of course, possible to use in either of the systems described any suitable combination of the modulating arrangements shown in Figs. 1—a, 1—b, 1—c, 2—a or 2—b, with any of the current varying devices shown in these figures.

Still another possible arrangement is shown in Fig. 3, which represents another modification of the same general idea. An oscillator G generates an alternating current which is applied to the transmission line L through condensers $CR_1$ and $CR_2$. Choke coils $CH_1$ and $CH_2$ present a high impedance to this current. At the distant location the alternating current is transmitted by transformer TR to the modulator M. The coupling between the windings of the transformer TR is varied in accordance with the meter or gauge $I_1$. In this case the direct current from the modulator M is utilized to transmit the fluctuations representing the magnitude of the quantity. A low pass filter comprising condenser $CR_3$, choke coils $CH_3$ and $CH_4$ and condenser $CR_4$ passes the direct current to the line and prevents currents of other frequencies from the modulator M from flowing in the line L. The condenser $CR_4$ readily passes the alternating current.

The direct current is transmitted over the line L, passed by the choke coils $CH_1$ and $CH_2$, and indicated by the meter $I_2$. This indication is proportional to the magnitude of the distant quantity measured by $I_1$.

Another possible method of separating the currents flowing in opposite directions on the line is shown in Fig. 4. Current from generator $G_1$ is applied to the two line wires in parallel and ground in such manner as not to affect the metallic circuit, in this case by a mid-tap on the line winding of transformer $TR_1$. At the distant end this current is taken off the line in a similar manner and applied to the modulator $M''$. The frequency resulting from the modulation is impressed on the metallic circuit in the usual manner by transformer $TR_2$. The magnetic coupling between the windings of this transformer is varied by the gauge $I_1''$. At the transmitting end this current is transmitted through the repeating coil $TR_1$, passed by the filter or tuned circuit $F_3'$, and applied to the amplifier-rectifier $AR'$. The meter $I_2''$ indicates the amplitude of the received current and therefore is representative of the magnitude of the distant quantity.

Figs. 5—$a$, 5—$b$, 5—$c$ and 5—$d$ illustrate several arrangements for intermediate amplifiers or repeaters in the transmitting channel such as shown at R in Fig. 1—$a$. In Fig. 5—$a$ transmission from the line L at the left to L' on the right is accomplished through transformer $TR_1$, amplifier $A_2$ and transformer $TR_2$. The transformers are of the three-winding or hybrid coil type. The output from amplifier $A_2$ is applied to the line L' in such a way that no voltage is applied to the input of amplifier $A_1$. This is accomplished by means of the balancing network $N_2$ associated with the hybrid coil $TR_2$. Transmission in the opposite direction is accomplished in the same manner.

Fig. 5—$b$ shows an arrangement employing only one amplifier and hybrid coil. The output of amplifier $A_3$ is applied to the transformer $TR_3$ so that no voltage is induced in the input of the amplifier. In this way amplification for currents flowing in both directions on the line is accomplished with a single amplifier so that there is no mutual interference.

Since the currents in the two directions are of different frequency, an arrangement such as that shown in Fig. 5—$c$ may be used for intermediate amplification. A combination of filters or tuned circuits passes currents flowing from left to right from the line L to amplifier $A_5$, and another combination of filters or tuned circuits $F_2$ passes these frequencies to the line L'. Amplification in the opposite direction is accomplished by means of filters or tuned circuits $F_3$ and $F_4$ and amplifier $A_4$.

Fig. 5—$d$ shows a modification of the above system using only one amplifier for amplification in both directions. Filters or tuned circuits $F_5$ and $F_6$ pass the frequencies in one direction while filters $F_7$ and $F_8$ pass the frequencies in the opposite direction. The same amplifier is used for all the currents as shown.

An arrangement is shown in Fig. 6 in which the indication of the remote quantity is transmitted as the amplitude ratio of currents of two different frequencies. As in the other cases no source of power or moving electrical contact is necessary at the point when the indication originates. Oscillators $G_1$ and $G_2$ generate currents of two frequencies $f_1$ and $f_2$, which are transmitted to the line through the combination of filters or tuned circuits $F_1$. At the remote location two filters $F_2$ and $F_3$ separate these frequencies. Current of frequency $f_2$ is varied by the coupling between the two windings of transformer TR in accordance with the meter or gauge $I_1$. Current of frequency $f_1$ is transmitted to the modulator unvaried. Both frequencies are introduced to the modulator MD which may be any passive modulator, as already described. From the output of the modulator MD two new frequencies are selected, designated as $f_3$ and $f_4$. These two frequencies are passed by the combination of filters or tuned circuits $F_4$ and applied to the line L.

At the transmitting end these frequencies are separated by the filters or tuned circuits $F_5$ and $F_6$. Current of frequency $f_4$ is introduced to the amplifier-rectifier $AR_1$ and resultant direct current is impressed on one winding 61 of the differential relay DR. The received current of the other frequency $f_3$ is passed through the variable attenuator VA, amplified and rectified in $AR_2$ and impressed on the other winding 62 of the differential relay DR.

Normally the armature of the differential relay DR is in a neutral position when the currents flowing in the windings 61 and 62 are equal. When a sufficient difference exists between these two currents, one contact of the differential relay will be closed. This energizes either relay 63 or relay 64. Contacts of these relays are so arranged that power is applied from a suitable source to the motor MR to cause it to rotate in either one direction or the other, depending on the operation of the differential relay DR. The motor MR, through a coupling 65, changes the position of the variable attenuator VA in such a way that the equality of the currents in the windings 61 and 62 of the differential relay is restored. An indicator $I_2$ is attached to the variable attenuator VA to indicate its position. The position of variable attenuator VA is a measure of the amplitude ratio of the two received currents. Since this ratio has been made dependent on the magnitude of the distant quantity, the dial $I_2$ may be made to indicate the magnitude of this quantity in a way which will be explained.

The operation of the system shown in Fig. 6 will now be analyzed for a particular case, and the method of determining the frequency allocation so that the indication will be independent of the line characteristics will be illustrated. Let it be assumed that the currents generated by oscillators $G_1$ and $G_2$ may be expressed as sine functions, such as $i=\omega t$, where $\omega=2\pi f$, $f$ being the frequency. Assume that the amplitude of each frequency is unity when transmitted. Now consider that the line loss is made up of two components, one, denoted by $a$, which is constant at all frequencies, and another, denoted by $b$, which varies in some known manner with frequency and also may vary from time to time. Now the currents arriving at the distant point may be expressed as:

$$i_1 = ab_1 \sin \omega_1 t \quad (1)$$
$$i_2 = ab_2 \sin \omega_1 t \quad (2)$$

After being separated, current of frequency $f_2$ is varied by the transformer TR in the ratio $c$. Current of frequency $f_1$ is introduced into the modulator MD unvaried. The currents at the input of the modulator may now be expressed as:

$$i_1' = ab_1 \sin \omega_1 t \quad (3)$$
$$i_2' = ab_2 c \sin \omega_2 t \quad (4)$$

Now assume that the modulator MD is of the third order type and let the output frequencies selected by filters $F_3$ and $F_4$ be chosen so that $f_3 = 3f_1$, and $f_4 = 2f_2 - f_1$. Currents of these frequencies may be written:

$$i_3 = \tfrac{1}{4} a^3 b_1 b_2^2 c^2 \sin 3\omega_1 t \quad (5)$$
$$i_4 = \tfrac{3}{4} a^3 b_1 b_2^2 c^2 \sin (2\omega_2 - \omega_1) t \quad (6)$$

After being transmitted back to the starting point the effect of the transmission efficiency of the line will be expressed by:

$$i_3' = \tfrac{1}{4} a^4 b_1^3 b_3 \sin 3\omega_1 t \quad (7)$$
$$i_4' = \tfrac{3}{4} a^4 b_1 b_2^2 c^2 b_4 \sin (2\omega_2 - \omega_1) t \quad (8)$$

Current of frequency $f_3$ is now attenuated by the variable attenuator VA in the ratio $d$ and the gain of the amplifier-rectifiers $AR_1$ and $AR_2$ will be denoted as $e_1$ and $e_2$, respectively. The currents may now be expressed as $$i_3'' = \tfrac{1}{4} a^4 b_1^3 b_3 d e_2 \sin 3\omega_1 t \quad (9)$$
$$i_4'' = \tfrac{3}{4} a^4 b_1 b_2^2 c^2 b_4 e_1 \sin (2\omega_2 - \omega_1) t \quad (10)$$

Since the currents in the differential relay DR are maintained equal by the variable attenuator, the amplitudes of the input currents to the rectifiers $AR_1$ and $AR_2$ must also be equal. Therefore:

$$\tfrac{1}{4} a^4 b_1^3 b_3 d e_2 = \tfrac{3}{4} a^4 b_1 b_2^2 c^2 b_4 e_1 \quad (11)$$

If now we express the above current ratio in decibels* relative to an arbitrary reference value,

*See "Decibel—the name for the transmission unit," by W. H. Martin, Bell System Technical Journal, January 1929.

we may write Equation (11) thus $$20 \log \tfrac{1}{2} + 80 \log a + 60 \log b_1 + 20 \log b_3 + 20 \log d + 20 \log e_2 = 20 \log \tfrac{3}{4} + 80 \log a + 20 \log b_1 + 40 \log b_2 + 40 \log c + 20 \log b_4 + 20 \log e_1 \quad (12)$$

If we designate the ratio $a$ as $A$ (in $db$), that is, $A = 20 \log a$, and similarly throughout, we may write $$12 + 4A + 3B_1 + 3B + D + E_2 = 2.5 + 4A + B_1 + 2B_2 + B_4 + 2C + E_1 \quad (13)$$

This equation will be satisfied if the following relations obtain:

$$E_2 + 12 = E_1 + 2.5 \text{ or } E_1 - E_2 = 9.5 \quad (14)$$
$$D = 2C \quad (15)$$
$$3B_1 + B_3 = B_1 + 2B_2 \text{ or } 2B_1 + B_3 = 2B_2 + B_4 \quad (16)$$

If now we know the manner of variation of transmission loss with frequency, we may determine the frequencies to be used so that the condition of Equation (16) will be satisfied. As an example assume that the variable component of the loss $B$ in $db$ varies linearly with frequency, that is, $B_1 \propto f_1$, etc. Then from Equation (16)

$$2f_1 + f_3 = 2f_2 + f_4 \quad (17)$$

If we let $f_2 = k f_1$, then $f_3 = 3 f_1$ and $f_4 = (2k-1) f_1$.

Substituting these values in Equation (17) we obtain $$2f_1 + 3f_1 = 2k f_1 + (2k-1) f_1 \quad (18)$$
$$\text{and } k = 1.5 \quad (19)$$

In the example assumed, therefore, the transmitted frequencies should have the ratio 1.5 in order to satisfy Equation (16). The gain of the amplifier-rectifiers $AR_1$ and $AR_2$ may be easily adjusted to satisfy Equation (14). Therefore, Equation (15) will hold true, that is, the indication which depends on D will correspond with the magnitude of the distant quantity, which controls C, as shown, regardless of the changes in the transmission efficiency of the line.

In case it is desirable to indicate a total of the magnitudes of several remotely located quantities, this may be readily accomplished by means of the arrangement shown in Fig. 6. Three remote metering systems similar to those described in Figs. 1, 2 or 3 are shown, each consisting of a transmitting apparatus TR, a line L, modulating apparatus MD, a meter or gauge I, receiving apparatus RC and a meter I'. The magnitude of the quantity measured by $I_1$ is indicated by the meter $I_1'$ as has already been described, the output current of the receiving apparatus RC being proportional to the magnitude of the distant quantity. In order to obtain an indication of the total of the output currents from the different receivers $RC_1$, $RC_2$ and $RC_3$, these outputs are connected in parallel and the total is indicated by $I_4$. The indication on the meter $I_4$, therefore, is proportional to the total of the magnitudes of the distant quantities.

Any of the various known methods of indicating the total of several indications may be used in conjunction with remote metering systems of the type disclosed herein. One such method has been described in the inventors' copending application No. 662,002, filed March 21, 1933. It would also be easily possible to actuate an integrating device of some suitable type in connection with any of the remote indicating systems described herein.

Although the invention has been herein described in connection with certain particular embodiments, it will be understood that many modifications, both of circuit arrangement and instrumentalities employed, will be made without departing from the spirit or scope of the invention as set forth in the appended claims.

What is claimed is:

1. The method of producing at a distant point an indication of a quantity existing at some other point which consists in varying, at the point where said quantity is located and in accordance with the magnitude thereof, the amplitude of current received from said other point, producing from said varied current a current of different characteristics but having the same variations transmitting said current so produced to said distant point and utilizing the received current at said distant point to produce an indication of the magnitude of said quantity.

2. The method of producing at a point an indication of a quantity existing at some other point which consists in transmitting electrical energy from said first mentioned point to said second mentioned point, varying the amplitude of the received energy at said second-mentioned point in accordance with the magnitude of said quantity, translating said varied energy into energy of different characteristics but having the same variations, transmitting said translated energy to said first mentioned point and utilizing the energy received at said first mentioned point to produce an indication of said quantity.

3. The method of producing at a distant point an indication of a quantity existing at some other point which consists in transmitting to said last mentioned point a plurality of frequencies, utilizing these frequencies to produce a plurality of other frequencies, varying the current amplitude of said last mentioned frequencies in accordance with the magnitude of said quantity, transmitting said varied currents to said distant point and utilizing the amplitudes of said currents to produce an indication of said quantity.

4. The method of producing at a point an indication of a quantity existing at some other point which consists in producing at said first mentioned point a plurality of frequencies, transmitting said frequencies to said second mentioned point, utilizing said frequencies to produce a plurality of other frequencies, varying the amplitude of at least one of said last mentioned frequencies in accordance with the magnitude of said quantity, transmitting said last mentioned frequencies back to said first mentioned point and utilizing the amplitude of the received frequencies to produce an indication of said quantity.

5. The method of producing at a point an indication of a quantity existing at some other point which consists in producing at said first mentioned point a plurality of frequencies, transmitting said frequencies to said second mentioned point, utilizing said frequencies to produce a plurality of other frequencies, varying the amplitude of at least one of said last mentioned frequencies in accordance with the magnitude of said quantity, transmitting said last mentioned frequencies back to said first mentioned point and utilizing the amplitudes of the received frequencies to produce an indication of said quantity, and adjusting said sets of frequencies so that said indication is substantially independent of variations in the efficiency of the transmission channel.

6. The method of producing at a point an indication of a quantity existing at some distant point which consists in producing at said first mentioned point a plurality of frequencies, transmitting said frequencies to said distant point, utilizing said frequencies to produce a plurality of other frequencies, modulating the amplitudes of said last mentioned frequencies in accordance with the magnitude of said quantity, transmitting said modulated frequencies back to said first mentioned point over the same transmission channel, and utilizing the amplitudes of the received frequencies to produce an indication of said quantity.

7. The method of producing at a point an indication of a quantity existing at some distant point, which consists in producing at said first mentioned point two frequencies, transmitting said frequencies to said distant point, utilizing said frequencies to produce a third frequency, modulating the amplitude of said third frequency in accordance with the magnitude of said quantity, transmitting said third frequency back to said first mentioned point and utilizing the received amplitude thereof to produce an indication of said quantity.

8. The method of producing at a point an indication of a quantity existing at some other point which consists in producing at said first mentioned point a frequency, transmitting said frequency to said second mentioned point, utilizing the received frequency to produce a second frequency, varying the amplitude of said second frequency in accordance with the magnitude of said quantity, transmitting said varied wave back to said first mentioned point and utilizing the amplitude thereof to produce an indication of said quantity.

9. The method of producing at a point an indication of a quantity existing at some other point which consists in producing at said first mentioned point a plurality of frequencies, transmitting said frequencies to said second mentioned point, varying the amplitude of said frequencies in accordance with the magnitude of said quantity, rectifying said frequencies, transmitting the resulting direct current back to said first mentioned point, and utilizing the amplitude thereof to produce an indication of the magnitude of said quantity.

10. The method of producing at a point an indication of a quantity existing at some other point which consists in transmitting from said first mentioned point to said second mentioned point a frequency, varying the amplitude of said frequency in accordance with the magnitude of said quantity, rectifying said frequency, transmitting the resulting direct current back to said first mentioned point, and utilizing the amplitude thereof to produce an indication of the magnitude of said quantity.

11. In a remote indicating system, means at a point for varying, in accordance with the magnitude of a quantity, the amplitude of a plurality of currents received from some other point, means for transmitting said varied currents to some distant point, and means at said distant point for utilizing the received currents to produce an indication of the magnitude of said quantity.

12. In a remote indicating system, means for producing a plurality of currents of different frequencies, means for transmitting said currents to a distant point, means at said distant point for producing a plurality of currents of frequencies different from said original frequencies, means for varying the current of at least one of said latter frequencies in accordance with the magnitude of a quantity existing at said distant point, means for transmitting said last mentioned frequencies to a point where it is desired to produce an indication of said quantity, and means for utilizing the amplitudes of the received frequencies at this point to produce an indication of the magnitude of the distant quantity.

13. In a remote indicating system, means for producing two currents of different frequencies, means for transmitting said currents to a distant point, means at said distant point for utilizing said currents to produce a third current of frequency different from said first two frequencies, means for varying the current amplitude of said third frequency in accordance with the magnitude of a quantity, means for transmitting current of said third frequency to the point of origin of said first two frequencies, and means for utilizing the received amplitude of said third frequency to produce an indication of the magnitude of said quantity.

14. In a remote indicating system, means for producing a frequency, means for transmitting said frequency to some distant point, means at said distant point for producing a harmonic of said first frequency, means for varying the amplitude of said harmonic in accordance with the magnitude of a quantity, means for retransmitting said harmonic to the point of origin of said first frequency, and means at said point for utilizing the amplitude of said harmonic to produce an indication of the magnitude of said quantity.

15. In a remote indicating system, means for producing current of a desired frequency, means for transmitting said current to a distant point, means for varying the amplitude of said current in accordance with the magnitude of a quantity, means for rectifying said current, means for transmitting the resulting direct current back to the point of origin of said original frequency, and means for utilizing the amplitude thereof to produce an indication of the magnitude of said quantity.

16. In a remote indicating system, means at some point for producing two currents of different frequencies, means for transmitting said currents to a distant point, means at said distant point for producing a third frequency, said producing means requiring no source of power, means for varying the amplitude of said third frequency in accordance with the magnitude of some quantity, said varying means involving no moving electrical contacts, means for transmitting said third frequency back to the first mentioned point, means at said first mentioned point for utilizing the amplitude of said third frequency to produce an indication of said quantity.

17. In a remote indicating system, means at some point for producing current of a desired frequency, means for transmitting said current to a distant point, means at said distant point for producing a harmonic of said first frequency, said producing means requiring no source of power, means for varying the amplitude of said harmonic in accordance with the magnitude of some quantity, said varying means involving no moving electrical contacts, means for transmitting said harmonic back to said first mentioned point over the same channel, means at said first mentioned point for utilizing the amplitude of said harmonic to produce an indication of said quantity.

18. In a remote indicating system, means for producing two currents of different frequency, means for transmitting said currents to a distant point, means at said distant point including a modulator for producing a third frequency dependent on said first and second frequencies, means for varying the amplitude of said third frequency in accordance with the magnitude of some quantity, means for applying said third frequency to the transmission channel in such a way that no component of said third frequency is applied to the input of said modulator, means at the receiving location for utilizing the amplitude of said third frequency to produce an indication of the magnitude of said quantity.

19. In a remote indicating system, means for generating at some point two currents of different frequency, means for transmitting said currents to a distant point, means at this point for utilizing said two frequencies to produce a third and a fourth frequency, the amplitude of one of which is varied in accordance with the magnitude of some quantity, means for transmitting said third and fourth frequencies over the same channel to said first mentioned point, and means at said first mentioned point for utilizing the amplitude relation between said third and fourth frequencies to produce an indication of the magnitude of said quantity.

20. In a remote indicating system, means for generating at some point two currents of different frequency, means for transmitting said currents to a distant point, means at said distant point for utilizing said two frequencies to produce a third and a fourth frequency, the amplitude of one of which is varied in accordance with the magnitude of some quantity, means for transmitting said third and fourth frequencies over the same channel to the first mentioned point and means at said first mentioned point for utilizing the amplitude relations between said third and fourth frequencies to produce an indication of the magnitude of said quantity, the apparatus mentioned being adjusted to bring the said four frequencies to such values that the said indication will remain substantially constant for variations in the transmission characteristics of the said channel.

21. In a remote indicating system, means for generating at some point a plurality of frequencies, means for transmitting said frequencies to a distant point, means at said distant point for utilizing said frequencies to produce a plurality of other frequencies, means for varying the amplitude of at least one of said last mentioned frequencies in accordance with the magnitude of some quantity, means for transmitting said last mentioned frequencies over the same channel to said first mentioned point, and means at said first mentioned point for utilizing the amplitude relations between said last mentioned frequencies to produce an indication of the magnitude of said quantity.

22. In a remote indicating system, means for generating at some point a plurality of frequencies, means for transmitting said frequencies to a distant point, means at said distant point for utilizing said frequencies to produce a plurality of other frequencies, means for varying the amplitude of at least one of said last mentioned frequencies in accordance with the magnitude of some quantity, means for transmitting said last mentioned frequencies over the same channel to said first mentioned point, and means at said first mentioned point for utilizing the amplitude relations between said last mentioned frequencies to produce an indication of the magnitude of said quantity, the apparatus mentioned being adjusted to bring the said four frequencies to such values that the said indication will remain substantially constant for variations in the transmission characteristics of the said channel.

ESTILL I. GREEN.
WARREN H. TIDD.